US012013262B2

(12) United States Patent
Lindenmayr et al.

(10) Patent No.: US 12,013,262 B2
(45) Date of Patent: Jun. 18, 2024

(54) SENSOR ASSEMBLY FOR CAPTURING A TORQUE AND AN ANGULAR POSITION OF A ROTATABLE SHAFT

(71) Applicant: Schaeffler Technologies AG & Co. KG, Herzogenaurach (DE)

(72) Inventors: Thomas Lindenmayr, Nuremberg (DE); Bernd Wittmann, Pommersfelden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 176 days.

(21) Appl. No.: 17/641,872

(22) PCT Filed: Jul. 23, 2020

(86) PCT No.: PCT/DE2020/100651
§ 371 (c)(1),
(2) Date: Mar. 10, 2022

(87) PCT Pub. No.: WO2021/052525
PCT Pub. Date: Mar. 25, 2021

(65) Prior Publication Data
US 2022/0326048 A1 Oct. 13, 2022

(30) Foreign Application Priority Data
Sep. 16, 2019 (DE) ...................... 10 2019 124 857.4

(51) Int. Cl.
*G01D 5/14* (2006.01)
*G01L 3/10* (2006.01)

(52) U.S. Cl.
CPC .............. *G01D 5/145* (2013.01); *G01L 3/101* (2013.01)

(58) Field of Classification Search
CPC .. G01B 7/31; G01L 3/10; G01L 3/102; G01L 5/221; G01L 3/101; G01L 3/104;
(Continued)

(56) References Cited

U.S. PATENT DOCUMENTS 7,562,591 B2 * 7/2009 Lee .......................... G01L 3/105
    73/862.331
9,869,539 B2 * 1/2018 Klimenko ............... G01L 3/104
(Continued)

FOREIGN PATENT DOCUMENTS

| CN | 1175999 A | 3/1998 |
| CN | 101722986 A | 6/2010 |

(Continued)

OTHER PUBLICATIONS

Author: H Ruser, et al. Source: Magnetic torque measurement with low-cost sensor Date: Mar. 2002 Country: Germany.

*Primary Examiner* — Vinh P Nguyen

(57) ABSTRACT

The present disclosure relates to a sensor assembly for simultaneously capturing an angular position and a torque of a rotatable shaft. The sensor assembly comprises, for determining the angular position, a main body, two additional bodies, which are arranged coupled for rotation on the main body, and two angle resolvers, which are arranged on a circuit board in the immediate vicinity of the additional bodies. In this arrangement, the angles of the additional bodies are determined by the angle resolvers and passed as an angle signal to an evaluation unit arranged on the circuit board. The sensor assembly further comprises a direct coating, which captures a torque signal from the rotating shaft and passes this signal over a connection line to the evaluation unit. The connection line has a section wound multiple times around the shaft to permit a rotation of the shaft by at least +/−900°.

20 Claims, 2 Drawing Sheets

(58) Field of Classification Search
CPC ...... G06F 3/0362; G06F 3/0346; G06F 11/00;
G06F 3/016; G06F 3/0354; G05D 27/02;
G05D 1/0231; G01D 5/3473; G01D
5/145; G01D 5/2046; G01D 5/2073;
G01D 11/245; G01D 5/12; G01D 5/14;
G01D 5/202; G01D 5/2053; G01D
5/2266; G01D 5/20; G01D 5/2013; G01D
2205/26; G01D 11/30; G01D 5/2452;
G01D 2205/28; B62D 15/0215; B62D
6/10
See application file for complete search history.

(56) References Cited

U.S. PATENT DOCUMENTS

| | | | |
|---|---|---|---|
| 10,551,216 B2* | 2/2020 | Aichriedler | ............ G01D 5/145 |
| 10,704,926 B2* | 7/2020 | Aichriedler | ............ G01D 5/145 |

FOREIGN PATENT DOCUMENTS

| | | |
|---|---|---|
| CN | 103196360 A | 7/2013 |
| CN | 104272080 A | 1/2015 |
| CN | 109804225 A | 5/2019 |
| DE | 19506938 A1 | 8/1996 |
| DE | 102006057225 A1 | 3/2008 |
| DE | 102010033769 A1 | 2/2012 |
| DE | 102011002563 A1 | 6/2012 |
| DE | 102012200239 A1 | 7/2013 |
| DE | 102012208492 A1 | 11/2013 |
| DE | 102012024382 A1 | 6/2014 |
| DE | 102013204924 A1 | 9/2014 |
| DE | 102016107916 A1 | 11/2017 |
| EP | 2180296 A1 | 4/2010 |
| WO | 2018059622 A1 | 4/2018 |

* cited by examiner

SENSOR ASSEMBLY FOR CAPTURING A TORQUE AND AN ANGULAR POSITION OF A ROTATABLE SHAFT

CROSS-REFERENCE TO RELATED APPLICATIONS

This application is the U.S. National Phase of PCT Application No. PCT/DE2020/100651 filed on Jul. 23, 2020, which claims priority to DE 10 2019 124 857.4 filed on Sep. 16, 2019, the entire disclosures of which are incorporated by reference herein.

TECHNICAL FIELD

The present disclosure relates to a sensor assembly for simultaneously determining a torque and an angular position of a rotatable shaft. The sensor assembly can be used for determining an angular position and a torque on a rotatable machine element, in particular on a steering element.

BACKGROUND

A method for determining an angular position is known from DE 195 06 938 A1. The method described herein is used for determining an angular position of a rotatable body over 360°, which can serve as a steering shaft of a motor vehicle. This rotatable body interacts with at least two further rotatable bodies. For example, the rotatable bodies are gear wheels or sprockets with meshing teeth. The angular position of the rotatable bodies is determined by means of two sensors, which are connected to an electronic evaluation circuit that uses an algorithm to determine the actual angular position. The number of teeth of the further rotatable bodies differs from the number of teeth of the first rotatable body, as a result of which a more accurate determination of the angular position is enabled.

An angular position determining device for determining the angular position of a rotatable shaft is known from EP 2 180 296 A1, in particular for determining the angular position of a steering shaft or a rotatable shaft of a motor vehicle coupled thereto. The device includes a main rotor and an auxiliary rotor coupled to the main rotor. A first sensor unit is arranged on the main rotor and is designed as an inductively acting sensor and has an induction rotor that rotates with the main rotor and a stationary stator. Furthermore, a second sensor unit is arranged on the auxiliary rotor and is designed as a magnetically acting sensor comprising a sensor element and a magnetic body, wherein the sensor element is designed to detect a movement of the magnetic body.

From practice, angular position determining devices with sensor units are known, which are designed as potentiometers. These are subject to wear and are prone to failure. Furthermore, the measurement accuracy is limited to a few angular degrees. Sensor units based on a magnetic measuring principle can have a negative influence on one another, which can cause a distortion of the measurement result.

Magnetically acting sensor units can be designed as anisotropic magneto-resistive sensors (AMR), giant magneto-resistive sensors (GMR) or Hall sensors. To cover a measuring range larger than 360°, the known sensor units require at least one driving gear wheel and at least one output gear wheel. The signals obtained in this way are processed into a single angle signal using the vernier algorithm. In addition, external magnetic fields can act as a source of interference and considerably influence measurement.

Sensor units are also known which use optical sensors and have, for example, an active photodiode and an optical scale. The measurement accuracy is limited by the accuracy of the optical scale. Manufacture is therefore expensive and the sensor units are sensitive to dirt and temperature. Furthermore, optical sensors require a comparatively large installation space. Also known are angular position determining devices, which have inductively acting sensors. The combination of a plurality of inductively acting sensors is only possible to a limited extent since the sensors can have an undesirable effect on one another.

Strain gauges are preferred for measurements on a rotating machine element. For example, a strain gauge as a direct coating for torque measurement is known from DE 10 2012 208 492 A1. The direct coating consists of a metallic material with an insulating layer applied and a deformation-sensitive layer placed on top. The deformation-sensitive layer is structured by a laser according to the desired sensor shape.

Ruse, H. et al: "Magnetische Drehmomentmessung mit Low-Cost Sensor" ("Magnetic Torque Measurement with Low-Cost Sensor") describes a method for torque measurement in which the change in permeability of the material of a rotating shaft is detected by a sensor. This is possible using the magnetoelastic effect of ferromagnetic materials. Here, a change in length caused by an externally applied moment triggers a change in the magnetic properties of the material. These changes are detected by means of a cross-wound arrangement in the sensor. Based on the measured change in permeability of the material, the torque can be inferred. In this case, permeability decreases in the direction of compression and increases in the strain-direction. The magnetic flux caused by the change in permeability induces a voltage proportional to the torque, which allows the torque to be inferred.

SUMMARY

Proceeding from the prior art, the present disclosure addresses the problem of providing an improved, cost-effective and space-saving sensor assembly for simultaneously measuring an angular position and a torque on a rotatable shaft, in particular a steering shaft.

The sensor assembly according to the disclosure is designed to measure an angular position and a torque on a rotatable shaft. The shaft can be part of a steering system of a vehicle. A main body is coupled to the rotatable shaft, which is rotated with the shaft and transmits its rotation to two additional bodies coupled for rotation. Angle marks are formed or arranged on each of the additional bodies and are detected by angle resolvers. The angle resolvers are arranged on a circuit board opposite the additional bodies. The circuit board is arranged in a non-rotating manner and/or in a manner fixed to the housing and carries an evaluation unit which receives the angle signals generated by the angle resolvers. The evaluation unit uses the vernier principle to determine the actual angular position of the main body and the rotatable shaft connected to it.

The main body is coaxially attached to the shaft and can be designed as a main gear wheel. The main gear wheel drives the additional bodies, which can be formed as secondary gear wheels, in the manner of a gearbox. The advantages of gear wheels used in this way are that they are form-fitting, slip-free and can transmit high torques. Alternatively, the main body and the additional bodies can also be designed as friction wheels or comparable gear elements.

As angle marks, the additional bodies can have teeth, wherein the number of teeth of the two additional bodies can differ by one tooth in order to be able to apply the vernier principle. Using this principle, the determination accuracy for the angular position of the shaft can be increased. Alternatively, the additional bodies can be friction wheels or pulleys, which are connected to the main body via a belt and driven by it. Angle marks, for example marking lines, arranged on the pulley can in turn be used to determine the angular position of the shaft.

The circuit board, which is formed in the manner of a disc, is mounted coaxially with the shaft assembly so that the rotatable shaft passes through an opening in the circuit board. This provides the advantage of a space-saving arrangement.

The angle resolvers can be formed by inductively and magnetically acting sensors. The advantages of a combination of such sensors are that they cannot influence one another. This achieves maximum safety since a plurality of independent channels are available for signal evaluation. Another advantage results from the application of the inductive sensors as a fine track of the vernier arrangement at high temperatures without the need for temperature compensation. Furthermore, inductive and magnetic sensors are insensitive to dirt. Compared to purely magnetically acting sensors, the proposed sensor combination offers the advantage of a very accurate measurement that is insensitive to interference. Alternatively, the angle resolvers arranged on the circuit board can be a combination of other sensors. Such combinations can, for example, be formed by an optical and an inductively acting sensor or an optical and a magnetically acting sensor. However, a combination of similar angle-determining sensors is also possible.

A target for an inductively acting sensor or a magnet for interaction with a magnetically acting sensor is located on each of the additional bodies opposite the angle resolvers arranged on the circuit board.

Furthermore, a torque sensor of the sensor assembly simultaneously determines the torque of the rotatable shaft. In this case, the torque sensor is coupled to the rotatable shaft and can be formed as a direct coating on the shaft. This direct coating forms a strain sensor that determines the mechanical stresses occurring on the basis of acting moments and generates a torque signal. This torque signal is passed to the evaluation unit on the circuit board by means of a connection line. The connection line has a section wound multiple times around the rotatable shaft to allow rotation of the shaft starting from the zero position by at least −/+360°, preferably at least −/+900°, without destroying the connection line or blocking the shaft. The evaluation unit determines the torque occurring on the rotatable shaft from the torque signal using implemented calculation rules and outputs this and the calculated angular position to superordinate units for further processing. The connection line eliminates the need for wireless telemetry or sliding contacts on the shaft.

Furthermore, the evaluation unit and the angle resolvers are can be arranged on a surface facing away from the wound section of the connection line. Instead, the side of the circuit board facing the wound section of the connection line serves as a guide surface. The connection line realizes a transmission-safe, interference-insensitive, wired and, at the same time, sliding-contact-free connection between the torque sensor and the evaluation unit.

The direct coating can consist of a multilayer system composed of at least one protective layer and at least one metal coating. Further, the multilayer system can include an insulation layer. The metal coating can be designed to be strain-sensitive and is arranged on the rotatable shaft. The protective layer can be formed on the metal coating. The direct coating can in particular be a multilayer system according to DE 10 2012 208 492 A1. An additional coating option is the direct coating in the form of a so-called Sensotect® coating. The advantage of a direct coating applied in this way is a precise acquisition of measurement data. Furthermore, the direct coating is neutral in terms of installation space used.

The rotatable shaft can be part of an electromechanical steering system or is at least coupled for rotation therewith in order to determine an absolute angular position and a torque of the electromechanical steering system simultaneously.

BRIEF DESCRIPTION OF THE DRAWINGS

Further details, advantages and further embodiments of the disclosure can be found in the following description, in which the disclosure is described and explained in more detail with reference to the exemplary embodiments shown in the drawing. In the figures.

DETAILED DESCRIPTION

Figure 1:
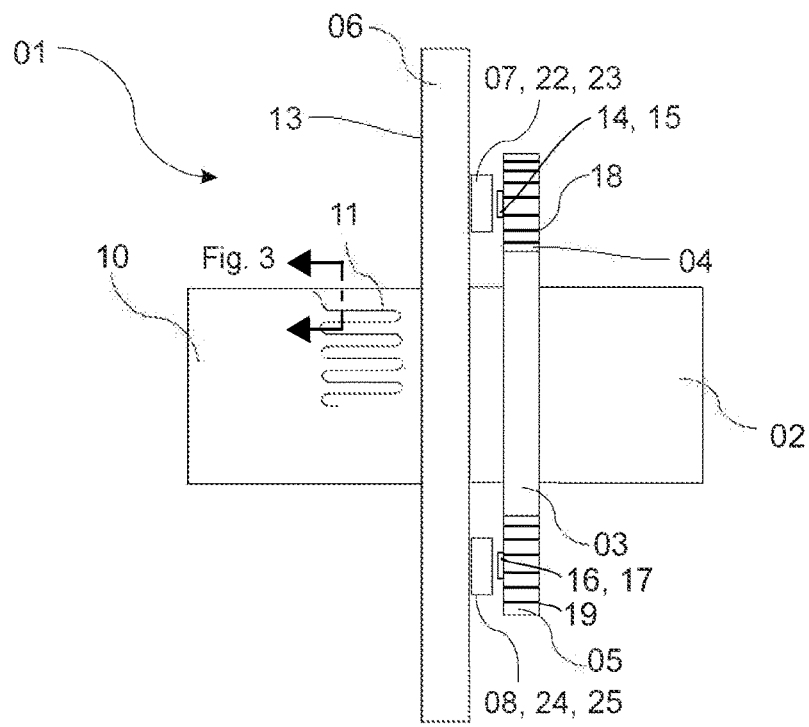
FIG. 1 shows a side view of an exemplary embodiment of a sensor assembly according to the disclosure.

FIG. 1 shows an exemplary embodiment of a sensor assembly 01 according to the present disclosure. The sensor assembly 01 is used for determining an angular position and a torque of a rotatable shaft 02, which can be part of an electromechanical steering system and is in particular a steering shaft. A main body 03 in the form of a gear wheel is arranged on this steering shaft 02 and rotates with the rotatable steering shaft 02. Two additional bodies 04, 05 coupled for rotation in the form of toothed sensor wheels are arranged on this gear wheel 03 and are caused to rotate by the gear wheel 03. It is possible to design the main body 03 to be larger than the additional bodies or sensor wheels 04, 05, as a result of which the additional bodies 04, 05 have a greater rotational speed than the main body 03. Alternatively, the spatial arrangement of the additional bodies 04, 05 on the main body 03 can differ from the arrangement in FIG. 1. Angle marks 18, 19, which in the simplest case are formed by the teeth, are on each of the respective sensor wheels 04, 05. The sensor wheels 04,05 have a different number of teeth, which differs by one tooth as shown in FIG. 1, and thus enables application of the vernier principle. Thus, these sensor wheels allow for a more precise angle determination than if an angle detection were only performed on the main body 03. Directly opposite the sensor wheels 04, 05, two angle resolvers 07, 08 are arranged on a circuit board 06, which evaluate the angle marks to determine the angle signals and forward them to an evaluation unit 09 (see FIG. 2). In example embodiments, a first angle resolver 07 can be an inductive sensor 22 or a magnetic sensor 23; likewise, a second angle resolver 08 can be an inductive sensor 24 or a magnetic sensor 25. A target 14 for the inductive sensor 22 can be located on the additional body 04 opposite the first angle resolver 07; and a target 16 for the inductive sensor 24 can be located on the additional body 05 opposite the second angle resolver 08. A magnet 15 for the magnetic sensor 23 can be located on the additional body 04 opposite the first angle resolver 07; and a magnet 17 for the magnetic sensor 25 can be located on the additional body 05 opposite the second angle resolver 08. The evaluation unit 09 can be a micro-controller which is attached to the circuit board 06 together with other electronic components.

The disc-like circuit board 06 is arranged coaxially with the steering shaft 02. If applicable, the circuit board 06 can also be used as a rotatable bearing for the steering shaft 02.

The sensor assembly further comprises a torque sensor 10 which is formed by a direct coating 11. The direct coating 11 is applied in an axial region on the surface of the steering shaft 02, close to the side of the circuit board 06 on which potentially no components are arranged. The direct coating 11 can consist of a multilayer system composed of at least one metal coating 20 arranged on the rotatable shaft 02, and at least one protective layer 21 formed on the metal coating 20, as shown in FIG. 3. This direct coating 11 can be a so-called Sensotect® structure, which detects the torque of the steering shaft 02 and supplies it as a torque signal to the evaluation unit 09 via a connection line 12 (see FIG. 2).

Figure 2:
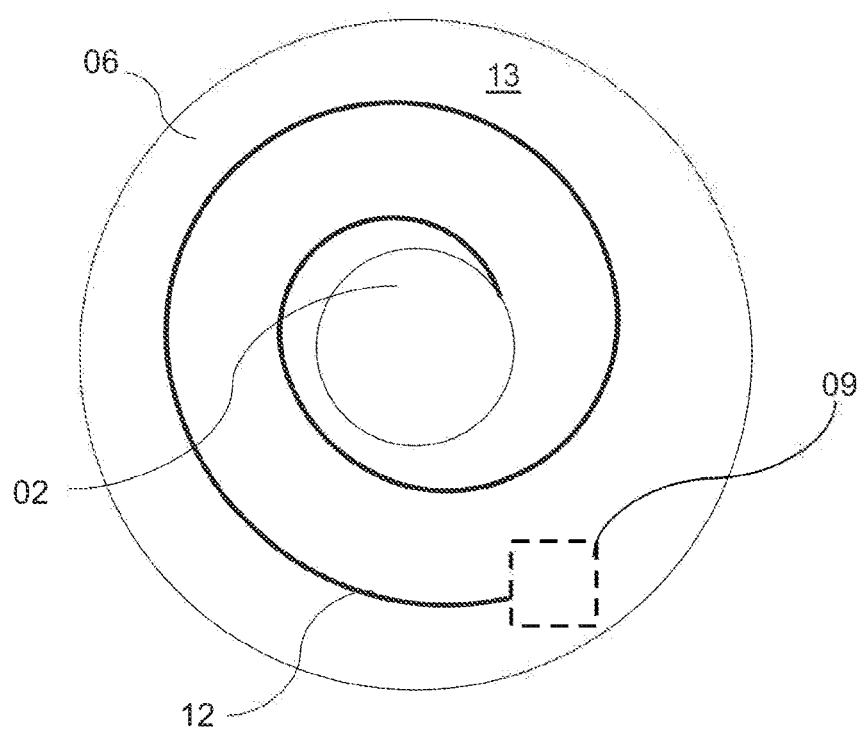
FIG. 2 shows a top view of the sensor assembly according to FIG. 1.
Figure 3:
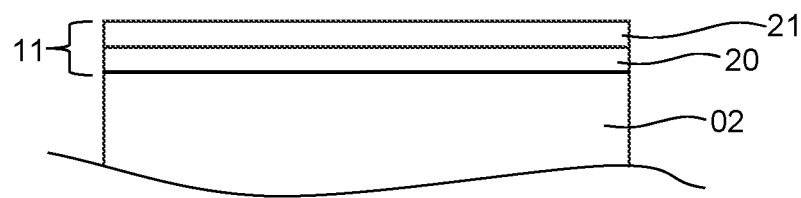
FIG. 3 shows a cross-sectional view taken from FIG. 2.

FIG. 2 shows a top view of the sensor assembly 01 according to FIG. 1. As can be seen in the top view, the circuit board 06 surrounds the steering shaft by having a shaft passage. In a manner not shown further, the circuit board 06 is arranged in a rotationally fixed manner. This can be realized, for example, by fastening to the housing or a bearing on the steering shaft 02. Furthermore, FIG. 2 shows that the connection line 12 spirals around the steering shaft 02 and rests on a guide surface 13 of the circuit board 06. Furthermore, the evaluation unit 09 is located on the circuit board 06, but on the side of the circuit board facing away from the connection line.

LIST OF REFERENCE SYMBOLS

01 Sensor assembly
02 Rotatable shaft
03 Main body
04 First additional body
05 Second additional body
06 Circuit board
07 First angle resolver
08 Second angle resolver
09 Evaluation unit
10 Torque sensor
11 Direct coating
12 Connection line
13 Guide surface
14 Target
15 Magnet
16 Target
17 Magnet
18 Angle marks, teeth
19 Angle marks, teeth
20 Metal coating
21 Protective layer
22 Inductive sensor
23 Magnetic sensor
24 Inductive sensor
25 Magnetic sensor

The invention claimed is:

1. A sensor assembly for simultaneously determining an angular position and a torque of a rotatable shaft, the sensor assembly comprising:
    the rotatable shaft configured to be rotatable by at least −/+360° starting from a zero position;
    a main body coupled to the rotatable shaft;
    a first body and a second body, each of the first body and the second body rotatably coupled to the main body;
    a rotationally fixed circuit board;
    two angle resolvers arranged on the circuit board, each one of the two angle resolvers arranged opposite to one of the first and second bodies, and each one of the two angle resolvers configured to supply an angle signal corresponding to one of the first and second bodies;
    an evaluation unit arranged on the circuit board, the evaluation unit configured to: i) receive the angle signals supplied by the angle resolvers, and ii) determine the angular position of the shaft from the angle signals received from the angle resolvers; and
    a torque sensor configured as a structured, strain-sensitive direct coating on the rotatable shaft, the strain-sensitive direct coating configured to communicate a torque signal to the evaluation unit via a connected connection line, and the evaluation unit configured to calculate the torque on the rotatable shaft from the torque signal, and the connection line includes a wound section wound multiple times around the shaft, the wound section configured to permit the rotation of the shaft, starting from the zero position, by at least −/+360°.

2. The sensor assembly of claim 1, wherein the main body is a main gear wheel fastened coaxially to the rotatable shaft, and the main gear wheel drivably engages two secondary gear wheels forming the first and second bodies.

3. The sensor assembly of claim 2, wherein a number of teeth of the two secondary gear wheels differs by one tooth.

4. The sensor assembly of claim 1, wherein the circuit board is formed as a disc and includes a shaft passage through which the rotatable shaft is rotatably guided.

5. The sensor assembly of claim 4, wherein the evaluation unit and the two angle resolvers are arranged on a surface of the circuit board facing away from the wound section of the connection line, and the surface is configured as a guide surface for the wound section of the connection line.

6. The sensor assembly of claim 1, wherein the strain-sensitive direct coating is configured as a multilayer system having at least one protective layer and at least one strain-sensitive metal coating.

7. The sensor assembly of claim 1, wherein the two angle resolvers comprise at least one of an inductive sensor or a magnetic sensor.

8. The sensor assembly of claim 7, wherein a target for an inductive sensor is arranged on at least one of the first and second bodies.

9. The sensor assembly of claim 7, wherein a magnet for a magnetic sensor is arranged on at least one of the first and second bodies.

10. The sensor assembly of claim 1, wherein the rotatable shaft is a component of a steering system of a vehicle, and the shaft is rotatable by at least −/+900°.

11. The sensor assembly of claim 1, wherein the wound section of the connection line is disposed between the torque sensor and the evaluation unit.

12. A sensor assembly for simultaneously determining an angular position and a torque of a rotatable shaft, the sensor assembly comprising:
    the rotatable shaft configured to be rotatable by at least −/+360° starting from a zero position;
    a main body coupled to the rotatable shaft;
    a first body and a second body, each of the first body and the second body rotatably coupled to the main body;

a rotationally fixed circuit board;

two angle resolvers arranged on the circuit board, the two angle resolvers configured to: supply angle signals corresponding to the first body and the second body;

an evaluation unit arranged on the circuit board, the evaluation unit configured to: i) receive the angle signals supplied by the angle resolvers, and ii) determine the angular position of the shaft from the angle signals received from the angle resolvers; and a torque sensor configured as a coating on the rotatable shaft, the coating configured to communicate a torque signal to the evaluation unit via a connection line, and the connection line includes a wound section wound multiple times around the shaft, the wound section configured to permit the rotation of the shaft, starting from the zero position, by at least −/+360°; and the evaluation unit configured to calculate the torque on the rotatable shaft from the torque signal.

13. The sensor assembly of claim 12, wherein at least one of the first or second bodies includes a target for an inductive sensor.

14. The sensor assembly of claim 12, wherein at least one of the first or second bodies includes a magnet for interaction with a magnetic sensor.

15. The sensor assembly of claim 12, wherein the circuit board is formed as a disc and includes a shaft passage through which the rotatable shaft is rotatably guided.

16. The sensor assembly of claim 12, wherein the coating is configured as a strain-sensitive direct coating.

17. The sensor assembly of claim 16, wherein the strain-sensitive direct coating is configured as a multilayer system having at least one protective layer and at least one strain-sensitive metal coating.

18. The sensor assembly of claim 12, wherein the two angle resolvers comprise of one of an inductive sensor and one of a magnetic sensor.

19. The sensor assembly of claim 12, wherein the main body, the first body, and the second body are gear wheels.

20. The sensor assembly of claim 19, wherein a number of teeth of the first body and the second body differs by one tooth.

* * * * *